(12) United States Patent
Graziosi et al.

(10) Patent No.: US 10,448,030 B2
(45) Date of Patent: Oct. 15, 2019

(54) CONTENT ADAPTIVE LIGHT FIELD COMPRESSION

(71) Applicant: Ostendo Technologies, Inc., Carlsbad, CA (US)

(72) Inventors: Danillo Bracco Graziosi, Carlsbad, CA (US); Zahir Y. Alpaslan, San Marcos, CA (US); Dale A. McNeill, Carlsbad, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 251 days.

(21) Appl. No.: 15/352,226

(22) Filed: Nov. 15, 2016

(65) Prior Publication Data

US 2017/0142427 A1    May 18, 2017

Related U.S. Application Data

(60) Provisional application No. 62/255,744, filed on Nov. 16, 2015.

(51) Int. Cl.
*H04N 19/186* (2014.01)
*H04N 19/103* (2014.01)
(Continued)

(52) U.S. Cl.
CPC .......... *H04N 19/186* (2014.11); *G06T 9/001* (2013.01); *G06T 9/20* (2013.01); *H04N 19/103* (2014.11);
(Continued)

(58) Field of Classification Search
None
See application file for complete search history.

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| CN | 101430426 | 5/2009 |
| CN | CN-103503023 | 1/2014 |

(Continued)

OTHER PUBLICATIONS

Balogh, Tibor et al., "Real-time 3D light field transmission", SPIE Photonics Europe, vol. 7724, Apr. 16, 2010, pp. 772406-1 to 772406-7.

(Continued)

*Primary Examiner* — Iman K Kholdebarin
(74) *Attorney, Agent, or Firm* — Womble Bond Dickinson (US) LLP

(57) ABSTRACT

A compression method for high-resolution light field display is disclosed for applications in which computer memory constraints and latency are critical. The disclosed compression algorithm takes advantage of the 3D structure of a light field to compress the raw light field information with a fixed compression ratio and simple decoding instructions. The compressed high-resolution light field achieves a reduced bandwidth with acceptable quality, and is packed in a way that can be transmitted using common interfaces. In a preferred embodiment, the compression algorithm is used as a post-processing stage after light field information acquisition or after rendering. In a further preferred embodiment, the compression algorithm is incorporated into the acquisition or rendering procedure to reduce memory and rendering processing. These and further embodiments generate a compressed light field with all information required for direct display.

19 Claims, 7 Drawing Sheets

(51) Int. Cl.
*G06T 9/20* (2006.01)
*G06T 9/00* (2006.01)
*H04N 19/597* (2014.01)
*H04N 19/154* (2014.01)

(52) U.S. Cl.
CPC ......... *H04N 19/154* (2014.11); *H04N 19/597* (2014.11); *G06T 2207/10024* (2013.01)

(56) References Cited

U.S. PATENT DOCUMENTS

| | | | |
|---|---|---|---|
| 6,091,767 A | 7/2000 | Westerman | |
| 6,097,394 A | 8/2000 | Levoy et al. | |
| 6,252,989 B1 | 6/2001 | Geisler et al. | |
| 6,549,308 B1 * | 4/2003 | Camahort | G03H 1/08 345/419 |
| 6,738,533 B1 | 5/2004 | Shum et al. | |
| 6,963,431 B2 | 11/2005 | Holzbach et al. | |
| 7,404,645 B2 | 7/2008 | Margulis | |
| 7,623,560 B2 | 11/2009 | El-Ghoroury et al. | |
| 7,767,479 B2 | 8/2010 | El-Ghoroury et al. | |
| 7,829,902 B2 | 11/2010 | El-Ghoroury et al. | |
| 7,978,407 B1 | 7/2011 | Connor | |
| 8,049,231 B2 | 11/2011 | El-Ghoroury et al. | |
| 8,098,265 B2 | 1/2012 | El-Ghoroury et al. | |
| 8,155,456 B2 | 4/2012 | Babacan et al. | |
| 8,243,770 B2 | 8/2012 | El-Ghoroury et al. | |
| 8,284,237 B2 | 10/2012 | Chen et al. | |
| 8,315,476 B1 * | 11/2012 | Georgiev | H04N 5/23232 348/207.99 |
| 8,334,889 B2 * | 12/2012 | Blanche | G03H 1/0005 348/14.07 |
| 8,401,316 B2 | 3/2013 | Babacan et al. | |
| 8,567,960 B2 | 10/2013 | El-Ghoroury et al. | |
| 8,681,185 B2 | 3/2014 | Guncer | |
| 8,854,724 B2 | 10/2014 | El-Ghoroury et al. | |
| 8,913,004 B1 | 12/2014 | Bozarth et al. | |
| 8,928,969 B2 | 1/2015 | Alpaslan et al. | |
| 8,970,646 B2 | 3/2015 | Guncer | |
| 9,097,890 B2 | 8/2015 | Miller et al. | |
| 9,110,504 B2 | 8/2015 | Lewis et al. | |
| 9,129,183 B2 | 9/2015 | Venkataraman et al. | |
| 9,179,126 B2 | 11/2015 | El-Ghoroury et al. | |
| 9,195,053 B2 | 11/2015 | El-Ghoroury et al. | |
| 9,274,608 B2 | 3/2016 | Katz et al. | |
| 9,524,682 B2 | 12/2016 | El-Ghoroury et al. | |
| 9,529,191 B2 | 12/2016 | Sverdrup et al. | |
| 9,538,182 B2 | 1/2017 | Mishourovsky et al. | |
| 9,681,069 B2 | 6/2017 | El-Ghoroury et al. | |
| 9,712,764 B2 | 7/2017 | El-Ghoroury et al. | |
| 9,769,365 B1 | 9/2017 | Jannard | |
| 9,965,982 B2 | 5/2018 | Lapstun | |
| 2002/0067521 A1 | 6/2002 | Holzbach et al. | |
| 2005/0018911 A1 | 1/2005 | Deever | |
| 2007/0035706 A1 * | 2/2007 | Margulis | G03B 21/20 353/122 |
| 2007/0229653 A1 | 10/2007 | Matusik et al. | |
| 2008/0043095 A1 | 2/2008 | Vetro et al. | |
| 2008/0043096 A1 | 2/2008 | Vetro et al. | |
| 2008/0187305 A1 * | 8/2008 | Raskar | G02B 27/0075 396/268 |
| 2008/0198920 A1 | 8/2008 | Yang et al. | |
| 2009/0086170 A1 | 4/2009 | El-Ghoroury et al. | |
| 2009/0268970 A1 | 10/2009 | Babacan et al. | |
| 2009/0278998 A1 | 11/2009 | El-Ghoroury et al. | |
| 2010/0003777 A1 | 1/2010 | El-Ghoroury et al. | |
| 2010/0007804 A1 | 1/2010 | Guncer | |
| 2010/0046848 A1 | 2/2010 | Witzgall | |
| 2010/0056274 A1 | 3/2010 | Uusitalo et al. | |
| 2010/0066921 A1 | 3/2010 | El-Ghoroury et al. | |
| 2010/0091050 A1 | 4/2010 | El-Ghoroury et al. | |
| 2010/0156894 A1 | 6/2010 | Holler et al. | |
| 2010/0220042 A1 | 9/2010 | El-Ghoroury et al. | |
| 2010/0225679 A1 | 9/2010 | Guncer | |
| 2010/0231585 A1 | 9/2010 | Weiblen | |
| 2010/0265385 A1 | 10/2010 | Knight et al. | |
| 2010/0309287 A1 | 12/2010 | Rodriguez | |
| 2011/0058021 A1 | 3/2011 | Chen et al. | |
| 2011/0134227 A1 | 6/2011 | Shin | |
| 2011/0255592 A1 | 10/2011 | Sung et al. | |
| 2011/0261050 A1 | 10/2011 | Smolic et al. | |
| 2012/0033113 A1 | 2/2012 | El-Ghoroury et al. | |
| 2012/0050481 A1 | 3/2012 | Chen et al. | |
| 2012/0069154 A1 | 3/2012 | Talstra et al. | |
| 2012/0105310 A1 | 5/2012 | Sverdrup et al. | |
| 2012/0183232 A1 | 7/2012 | Babacan et al. | |
| 2012/0213270 A1 | 8/2012 | Baraniuk et al. | |
| 2012/0309455 A1 | 12/2012 | Klose et al. | |
| 2012/0327139 A1 | 12/2012 | Margulis | |
| 2013/0010057 A1 | 1/2013 | Borel et al. | |
| 2013/0050786 A1 * | 2/2013 | Lucente | G02B 26/101 359/9 |
| 2013/0077880 A1 * | 3/2013 | Venkataraman | G06T 9/00 382/232 |
| 2013/0077882 A1 | 3/2013 | Venkataraman et al. | |
| 2013/0141895 A1 | 6/2013 | Alpaslan et al. | |
| 2013/0222633 A1 | 8/2013 | Knight et al. | |
| 2013/0258451 A1 | 10/2013 | El-Ghoroury et al. | |
| 2013/0282639 A1 | 10/2013 | Potkonjak | |
| 2013/0286053 A1 | 10/2013 | Fleck et al. | |
| 2013/0286178 A1 | 10/2013 | Lewis et al. | |
| 2013/0294504 A1 | 11/2013 | Mishourovsky et al. | |
| 2013/0321581 A1 | 12/2013 | El-Ghoroury et al. | |
| 2013/0342644 A1 * | 12/2013 | Rusanovskyy | H04N 19/597 348/43 |
| 2014/0002675 A1 | 1/2014 | Duparre et al. | |
| 2014/0079336 A1 | 3/2014 | Venkataraman et al. | |
| 2014/0092281 A1 * | 4/2014 | Nisenzon | H04N 13/232 348/262 |
| 2014/0098189 A1 | 4/2014 | Deng et al. | |
| 2014/0146201 A1 | 5/2014 | Knight et al. | |
| 2014/0168062 A1 | 6/2014 | Katz et al. | |
| 2014/0210823 A1 | 7/2014 | Maguire, Jr. | |
| 2014/0219558 A1 * | 8/2014 | Teng | G06T 9/00 382/166 |
| 2014/0232822 A1 | 8/2014 | Venkataraman et al. | |
| 2014/0267228 A1 | 9/2014 | Ofek et al. | |
| 2014/0285429 A1 | 9/2014 | Simmons | |
| 2014/0292620 A1 * | 10/2014 | Lapstun | G02B 26/10 345/6 |
| 2014/0340434 A1 * | 11/2014 | El-Ghoroury | G09G 3/3607 345/690 |
| 2014/0347361 A1 * | 11/2014 | Alpaslan | H04N 13/307 345/426 |
| 2014/0375856 A1 * | 12/2014 | Kaneko | H04N 19/597 348/302 |
| 2015/0033539 A1 | 2/2015 | El-Ghoroury et al. | |
| 2015/0178939 A1 | 6/2015 | Bradski et al. | |
| 2015/0201176 A1 * | 7/2015 | Graziosi | H04N 13/111 348/43 |
| 2015/0264223 A1 | 9/2015 | Akenine-Moller et al. | |
| 2015/0296203 A1 * | 10/2015 | Lucente | G03H 1/268 348/41 |
| 2015/0312560 A1 | 10/2015 | Deering et al. | |
| 2015/0319456 A1 | 11/2015 | Le Floch | |
| 2016/0021355 A1 | 1/2016 | Alpaslan et al. | |
| 2016/0028935 A1 | 1/2016 | El-Ghoroury et al. | |
| 2016/0182782 A1 | 6/2016 | El-Ghoroury et al. | |
| 2016/0191765 A1 | 6/2016 | El-Ghoroury et al. | |
| 2016/0191823 A1 | 6/2016 | El-Ghoroury et al. | |
| 2016/0360177 A1 | 12/2016 | Graziosi et al. | |
| 2017/0142427 A1 * | 5/2017 | Graziosi | H04N 19/103 |
| 2017/0184776 A1 | 6/2017 | El-Ghoroury et al. | |
| 2017/0264879 A1 | 9/2017 | Zhou | |

FOREIGN PATENT DOCUMENTS

| | | |
|---|---|---|
| CN | 104081414 | 10/2014 |
| CN | 104216128 | 12/2014 |
| EP | 1978754 | 10/2008 |
| WO | WO-2008/146190 | 12/2008 |
| WO | WO-2010/108024 | 9/2010 |
| WO | WO-2011/065738 | 6/2011 |

(56) References Cited

FOREIGN PATENT DOCUMENTS

| WO | WO-2012/149971 | 11/2012 |
|---|---|---|
| WO | WO-2013/049699 | 4/2013 |
| WO | WO-2015/106031 | 7/2015 |
| WO | WO-2016/172384 | 10/2016 |

OTHER PUBLICATIONS

Huang, Fu-Chung et al., "The Light Field Stereoscope: Immersive Computer Graphics via Factored Near-Eye Light Field Displays with Focus Cues", ACM Transactions on Graphics, vol. 34, No. 4, Article 60, Aug. 2015, pp. 60:1 to 60:12.
Kovacs, Peter T. et al., "Overview of the Applicability of H.264/MVC for Real-Time Light-Field Applications", 2014 3DTV-Conference: The True Vision—Capture, Transmission and Display of 3D Video (3DTV-CON), IEEE, Jul. 2, 2014, 4 pp. total.
Masia, Belen et al., "Display Adaptive 3D Content Remapping", Computers and Graphics, vol. 37, No. 8, Dec. 1, 2013, pp. 983-996.
Conti, Caroline et al., "Light-Field Video Coding Using Geometry-Based Disparity Compensation", 2014 3DTV-Conference: The True Vision—Capture, Transmission and Display of 3D Video (3DTV-CON), IEEE, Jul. 2, 2014, pp. 1-4.
Dricot, A. et al., "Integral Images Compression Scheme Based on View Extraction", 2015 23rd European Signal Processing Conference (EUSIPCO), Aug. 31, 2015, pp. 101-105.
Li, Yun et al., "Scalable Coding of Plenoptic Images by Using a Sparse Set and Disparities", IEEE Transactions on Image Processing, vol. 25, No. 1, Jan. 2016, pp. 80-91.
Zhang, Cha et al., "A survey on image-based rendering—representation, sampling and compression", Signal Processing: Image Communication, vol. 19, 2004, pp. 1-28.
"International Search Report and Written Opinion of the International Searching Authority dated Feb. 2, 2017; International Application No. PCT/US2016/062357", Feb. 2, 2017.
Aggoun, Amar et al., "Immersive 3D Holoscopic Video System", IEEE Multimedia Magazine, Special Issue on 3D Imaging Techniques and Multimedia Applications, vol. 20, No. 1, Jan.-Mar. 2013, pp. 28-37.
Akeley, Kurt et al., "A Stereo Display Prototype with Multiple Focal Distances", ACM Trans. Graph. (SIGGRAPH), vol. 23, 2004, pp. 804-813.
Alpaslan, Zahir Y. et al., "Development and Deployment of a Tiled Full Parallax Light Field Display System", Proceedings of the SPIE, Applications of Digital Image Processing XXXIX, vol. 9971, Sep. 27, 2016, pp. 99710J-1 to 99710J-8.
Alpaslan, Zahir Y. et al., "Parametric Characterization of Perceived Light Field Display Resolution", SID Symposium Digest of Technical Papers, vol. 47, No. 1, May 2016, pp. 1241-1245.
Alpaslan, Zahir Y. et al., "Small Form Factor Full Parallax Tiled Light Field Display", Proceedings of Electronic Imaging, SPIE—IS&T, vol. 9391, Feb. 9, 2015, pp. 93910E-1 to 93910E-10.
Arai, Jun et al., "Integral Three-Dimensional Television Using a 33-Megapixel Imaging System", Journal of Display Technology, vol. 6, No. 10, Oct. 2010, pp. 422-430.
Arai, Jun, "Three-Dimensional Television System Based on Spatial Imaging Method Using Integral Photography", International Conference on Acoustics, Speech, and Signal Processing (ICASSP) 2012, May 7-9, 2012, pp. 5449-5452.
Balogh, Tibor, "The HoloVizio System", Stereoscopic Displays and Virtual Reality Systems XIII, Proceedings of the SPIE—IS&T Electronic Imaging, vol. 6011, Jan. 27, 2006, pp. 60550U-1 to 60550U-12.
Bhaskaran, Vasudev, "65.1: Invited Paper: Image/Video Compression—A Display Centric Viewpoint", SID Symposium Digest of Technical Papers, vol. 38, No. 1, 2008, pp. 990-993.
Cakmakci, Ozan et al., "Head-Worn Displays: A Review", Journal of Display Technology, vol. 2, No. 3, Sep. 2006, pp. 199-216.

Candes, Emmanuel et al., "Near Optimal Signal Recovery From Random Projections: Universal Encoding Strategies?", 2004, pp. 1-39.
Candes, Emmanuel J. et al., "Robust Uncertainty Principles: Exact Signal Reconstruction From Highly Incomplete Frequency Information", IEEE Transactions on Information Theory, vol. 52, No. 2, Feb. 2006, pp. 489-509.
Chai, Jin-Xiang et al., "Plenoptic Sampling", Proceedings of the 27th Annual Conference on Computer Graphics and Interactive Techniques—SIGGRAPH '00, 2000, pp. 307-318.
Chen, Jianhong et al., "True Color Optical Simulation of Integral Imaging 3D Display", Proceedings of the International Display Workshops, vol. 21, Dec. 3, 2014, pp. 848-851.
Chen, Wei et al., "New Requirements of Subjective Video Quality Assessment Methodologies for 3DTV", Video Processing and Quality Metrics 2010 (VPQM), Scottsdale, United States, 2010, 6 pp. total.
Conti, Caroline et al., "Spatial Prediction Based on Self-Similarity Compensation for 3D Holoscopic Image and Video Coding", 2011 18th IEEE International Conference on Image Processing (ICIP), Sep. 11-14, 2011, pp. 961-964.
Curless, Brian et al., "A Volumetric Method for Building Complex Models from Range Images", Proceedings of the 23rd Annual Conference on Computer Graphics and Interactive Techniques, 1996, pp. 1-10.
Donoho, David L., "Compressed Sensing", IEEE Transactions on Information Theory, vol. 52, No. 4, Apr. 2006, pp. 1289-1306.
El-Ghoroury, Hussein S. et al., "Quantum Photonic Imager (QPI): A New Display Technology and Its Applications", Proceedings of the International Display Workshops, vol. 21, Dec. 3, 2014, pp. 1202-1205.
El-Ghoroury, Hussein S. et al., "Quantum Photonic Imager (QPI): A Novel Display Technology that Enables more than 3D Applications", SID Symposium Digest of Technical Papers, vol. 46, No. 1, May 2015, pp. 371-374.
Fehn, Christoph, "A 3D-TV Approach Using Depth-Image-Based Rendering (DIBR)", Proceedings of Picture Coding Symposium, San Francisco, CA, USA, Dec. 2004, 6 pp. total.
Fehn, Christoph, "Depth-Image-Based Rendering (DIBR), Compression and Transmission for a New Approach on 3D-TV", Proc. of SPIE Stereoscopic Displays and Virtual Reality Systems XI, 2004, pp. 93-104.
Forman, Matthew C. et al., "Objective Quality Measurement of Integral 3D Images", Proc. SPIE 4660, Stereoscopic Displays and Virtual Reality Systems IX, 155, 2002, 8 pp. total.
Furihata, Hisayoshi et al., "Novel view synthesis with residual error feedback for FTV", Stereoscopic Displays and Applications XXI, Proceedings of the SPIE—IS&T Electronic Imaging, vol. 7542, Jan. 2010, pp. 75240K-1 to 75240K-12.
Gilliam, Christopher et al., "Adaptive Plenoptic Sampling", 2011 18th IEEE International Conference on Image Processing, 2011, pp. 2581-2584.
Gortler, Steven J. et al., "The Lumigraph", Proceedings of the 23rd Annual Conference on Computer Graphics and Interactive Techniques (SIGGRAPH '96), 1996, pp. 43-52.
Graziosi, Danillo B. et al., "Compression for Full-Parallax Light Field Displays", Proceedings of SPIE—The International Society for Optical Engineering, Feb. 2014, 14 pp. total.
Graziosi, Danillo B. et al., "Compression for Full-Parallax Light Field Displays", Stereoscopic Displays and Applications XXV, Proc. of SPIE—IS&T Electronic Imaging, vol. 9011, Mar. 6, 2014, pp. 90111A-1 to 90111A-14.
Graziosi, Danillo B. et al., "Depth assisted compression of full parallax light fields", Stereoscopic Displays and Applications XXVI, Proceedings of SPIE—IS&T Electronic Imaging, vol. 9391, Mar. 17, 2015, pp. 93910Y-1 to 93910Y-15.
Guenter, Brian et al., "Foveated 3D Graphics", ACM SIGGRAPH Asia, Nov. 2012, 10 pp. total.
Halle, Michael W. et al., "Fast computer graphics rendering for full parallax spatial displays", Proc. SPIE 3011, Practical Holography XI and Holographic Materials III, Apr. 10, 1997, 8 pp. total.
Halle, Michael W., "Multiple Viewpoint Rendering for Three-Dimensional Displays", PhD Thesis, Program in Media Arts and

(56) References Cited

OTHER PUBLICATIONS

Sciences, School of Architecture and Planning, Massachusetts Institute of Technology, 1997, 164 pp. total.
Heide, Felix et al., "Adaptive Image Synthesis for Compressive Displays", Proc. of SIGGRAPH 2013 (ACM Transactions on Graphics), vol. 32, No. 4, 2013, 11 pp. total.
Hoffman, David M. et al., "Vergence-accommodation conflicts hinder visual performance and cause visual fatigue", Journal of Vision, vol. 8, No. 3, 2008, pp. 1-30.
Holliman, Nicolas S. et al., "Three-Dimensional Displays: A Review and Applications Analysis", IEEE Transactions on Broadcasting, vol. 57, No. 2, Jun. 2011, pp. 362-371.
Hoshino, H. et al., "Analysis of resolution limitation of integral photography", J. Opt. Soc. Am. A, vol. 15, No. 8, Aug. 1998, pp. 2059-2065.
Hu, Xinda et al., "Design and Assessment of a Depth-Fused Multi-Focal-Plane Display Prototype", Journal of Display Technology, vol. 10, No. 4, Apr. 2014, pp. 308-316.
Hua, Hong et al., "A 3D integral imaging optical see-through head-mounted display", Optics Express, vol. 22, No. 11, May 28, 2014, pp. 13484-13491.
International Organisation for Standardisation, "Call for Proposals on 3D Video Coding Technology", ISO/IEC JTC1/SC29/WG11, MPEG2011/N12036, Geneva, Switzerland, Mar. 2011, 20 pp. total.
International Organisation for Standardisation, "Use Cases and Requirements on Free-viewpoint Television (FTV)", ISO/IEC JTC1/SC29/WG11, MPEG2013/N14104, Geneva, Switzerland, Oct. 2013, 12 pp. total.
International Telecommunication Union, "H.264, Series H: Audiovisual and MultiMedia Systems, Infrastructure of audiovisual services—Coding of moving video, Advanced video coding for generic audiovisual services", ISO/IEC 14496-10:2003, Coding of Audiovisual Objects—Part 10: Advanced Video Coding, ITU-T Recommendation H.264, Mar. 2005, 343 pp. total.
Isaksen, Aaron et al., "Dynamically Reparameterized Light Fields", Proceedings of the 27th Annual Conference on Computer Graphics and Interactive Techniques (SIGGRAPH '00), 2000, pp. 297-306.
Iwadate, Yuichi et al., "Generating Integral Image from 3D Object by Using Oblique Projection", 18th International Display Workshops 2011 (IDS '11), Dec. 7-9, 2011, pp. 269-272.
Iwasawa, Shoichiro et al., "REI: an automultiscopic projection display", Proceedings of 3DSA2013, Selected paper 1, 2013, pp. 1-4.
Jang, Jae-Young et al., "3D Image Correlator using Computational Integral Imaging Reconstruction Based on Modified Convolution Property of Periodic Functions", Journal of the Optical Society of Korea, vol. 18, No. 4, Aug. 2014, pp. 388-394.
Javidi, Bahram et al., "Three-Dimensional Holographic Image Sensing and Integral Imaging Display", Journal of Display Technology, vol. 1, No. 2, Dec. 2005, pp. 341-346.
Kim, Changil, "Scene Reconstruction from a Light Field", https://graphics.ethz.ch/~kimc/publications/changil-kim-ms-thesis-2010-compressed.pdf, 2010, 72 pp. total.
Koike, T., "Theory, Design, and Application of 4-D Light Field Display", Ph.D. Dissertation, University of Tokyo, Mar. 23, 2009, 133 pp. total.
Kundu, Shinjini, "Light Field Compression Using Homography and 2D Warping", 2012 IEEE International Conference on Acoustics, Speech and Signal Processing (ICASSP), Mar. 25-30, 2012, pp. 1349-1352.
Lanman, Douglas et al., "Near-Eye Light Field Displays", ACM Transactions on Graphics (TOC), vol. 32, Issue 6, Article 220, Nov. 2013, 27 pp. total.
Lee, Cheon et al., "View Synthesis using Depth Map for 3D Video", Proceedings of 2009 APSIPA Annual Summit and conference, Sapporo, Japan, 2009, pp. 350-357.
Levoy, Marc et al., "Light Field Rendering", Computer Graphics, SIGGRAPH 96 Proceedings, 1996, pp. 31-42.
Lippmann, M. G., "Epreuves reversibles. Photographies integrales.", Comptes-Rendus Academie des Sciences, vol. 146, 1908, pp. 446-451.
Liu, Shujie et al., "New Depth Coding Techniques With Utilization of Corresponding Video", IEEE Transactions on Broadcasting, vol. 57, No. 2, Jun. 2011, pp. 551-561.
Lucente, M., "Computational holograhic bandwidth compression", IBM Systems Journal, vol. 35, Nos. 3&4, 1996, pp. 349-365.
Lucente, Mark, "Diffraction-Specific Fringe Computation for Electro-Holography", Doctoral Thesis Dissertation, MIT Dept. of Electrical Engineering and Computer Science, Sep. 1994, 171 pp. total.
Lucente, Mark, "Holographic bandwidth compression using spatial subsampling", Optical Engineering, Special Section on Electronic Holography, Jun. 1996, pp. 1-25.
Lucente, Mark, "Interactive Computation of Holograms Using a Look-up Table", Journal of Electronic Imaging, vol. 2, No. 1, pp. 28-34, Jan. 1993, 14 pp. total.
Lucente, Mark, "Interactive holographic displays: the first 10 years", Book chapter for "Holography—The First 50 Years", Draft: 2003, 2003, 17 pp. total.
Lucente, Mark, "Interactive three-dimensional holographic displays: seeing the future in depth", For special issue of SIGGRAPH's Computer Graphics publication on Current, New, and Emerging Display Systems, May 1997, 17 pp. total.
Magnor, Marcus et al., "Data Compression for Light-Field Rendering", IEEE Transactions on Circuits and Systems for Video Technology, vol. 10, No. 3, Apr. 2000, pp. 338-343.
Maimone, Andrew et al., "Computational Augmented Reality Eyeglasses", 2013 IEEE International Symposium on Mixed and Augmented Reality (ISMAR), Oct. 1-4, 2013, pp. 29-38.
Maimone, Andrew et al., "Focus 3D: Compressive Accommodation Display", ACM Transactions on Graphics, vol. 32. No. 5, 2013, 13 pp. total.
Malvar, Henrique S. et al., "Lifting-based reversible color transformations for image compression", Proc. of SPIE of Applications of Digital Image Processing, vol. 7073, 2008, pp. 707301-1 to 707301-10.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Masia, Belen et al., "A survey on computational displays: Pushing the boundaries of optics, computation, and perception", Computers & Graphics, vol. 37, 2013, pp. 1012-1038.
Matsubara, Rie et al., "Light field display simulation for light field quality assessment", Proceedings of the Stereoscopic Displays and Applications Conference XXVI (SPIE—IS&T), vol. 9391, Feb. 9-11, 2015, pp. 93910G-1 to 93910G-15.
Microsoft, "Microsoft HoloLens", downloaded from https://www.microsoft.com/en-us/hololens, admitted prior art, 5 pp. total.
Mori, Yuji et al., "View generation with 3D warping using depth information for FTV", Signal Processing: Image Communication, vol. 24, 2009, pp. 65-72.
Morvan, Yannick et al., "Platelet-based coding of depth maps for the transmission of multiview images", Proceedings of the SPIE, Stereoscopic Displays and Applications, vol. 6055, Feb. 2006, 12 pp. total.
Ng, Ren, "Fourier Slice Photography", ACM Trans. Graph., vol. 24, No. 3, Jul. 2005, pp. 735-744.
Oculus VR, LLC, "Oculus Gear VR", downloaded from https://www.oculus.com/gear-vr/, admitted prior art, 9 pp. total.
Oculus VR, LLC, "Oculus Rift", downloaded from https://www.oculus.com/rift/, admitted prior art, 15 pp. total.
Oh, Kwan-Jung et al., "Depth Reconstruction Filter and Down/Up Sampling for Depth Coding in 3-D Video", IEEE Signal Processing Letters, vol. 16, No. 9, Sep. 2009, pp. 747-750.
Oh, Kwan-Jung et al., "Hole-Filling Method Using Depth Based In-Painting for View Synthesis in Free Viewpoint Television (FTV) and 3D Video", Picture Coding Symposium (PCS) 2009, May 6-8, 2009, 4 pp. total.
Ohm, Jens-Rainer, "Overview of 3D Video Coding Standardization", Proceedings of the Three Dimensional Systems and Applications (3DSA) International Conference 2013, 2013, pp. 1-4.

(56) References Cited

OTHER PUBLICATIONS

Olsson, Roger et al., "A Combined Pre-Processing and H.264—Compression Scheme for 3D Integral Images", 2006 IEEE International Conference on Image Processing, 2006, pp. 513-516.
Olsson, Roger et al., "A Depth Dependent Quality Metric for Evaluation of Coded Integral Imaging Based 3D-Images", 3DTV Conference, 2007, 4 pp. total.
Park, Jae-Hyeung et al., "Recent progress in three-dimensional information processing based on integral imaging", Applied Optics, vol. 48, No. 34, Dec. 1, 2009, pp. H77-H94.
Piao, Yan et al., "Sub-sampling Elemental Images for Integral Imaging Compression", International Conference on Audio Language and Image Processing (ICALIP), 2010, pp. 1164-1168.
Razavi, R et al., "Low-delay video control in a personal area network for augmented reality", IET Image Processing, vol. 2, No. 3, 2008, pp. 150-162.
Reed, Nathan, "Depth Precision Visualized", retrieved online at https://developer.nvidia.com/content/depth-precision-visualized, Jul. 15, 2015, 11 pp. total.
Shi, Shasha et al., "Efficient Compression Method for Integral Images Using Multi-View Video Coding", 2011 18th IEEE International Conference on Image Processing, 2011, pp. 137-140.
Shum, Heung-Yeung et al., "Survey of Image-Based Representations and Compression Techniques", IEEE Transactions on Circuits and Systems for Video Technology, vol. 13, No. 11, Nov. 2003, pp. 1020-1037.
Sjostrom, Marten et al., "Improved Depth-Image-Based Rendering Algorithm", 3DTV Conference: The True Vision—Capture, Transmission and Display of 3D Video (3DTV-CON), 2011, 4 pp. total.
Sloan, Peter-Pike et al., "Time Critical Lumigraph Rendering", Proceedings of the 1997 ACM SIGGRAPH Symposium on Interactive 3D Graphics, 1997, 7 pp. total.
Smolic, Aljoscha et al., "Coding Algorithms for 3DTV—A Survey", IEEE Transactions on Circuits and Systems for Video Technology, vol. 17, No. 11, Nov. 2007, pp. 1606-1621.
Solh, Mashhour et al., "Depth Adaptive Hierarchical Hole-Filling for DIBR-Based 3D Videos", Proceedings of the SPIE, Three-Dimensional Image Processing (3DIP) and Applications II, vol. 8290, 2012, pp. 829004-1 to 829004-11.
Sullivan, Gary J. et al., "The H.264/AVC Advanced Video Coding Standard: Overview and Introduction to the Fidelity Range Extensions", SPIE Conference on Applications of Digital Imaging Processing XXVII, Special Session on Advances in the New Emerging Standard: H.264/AVC, Aug. 2004, pp. 1-21.
Sutherland, Ivan E., "A head-mounted three dimensional display", 1968 International Workshop on Managing Requirements Knowledge, 1968, pp. 757-564.
Takahashi, Keita, "Theoretical Analysis of View Interpolation With Inaccurate Depth Information", IEEE Transactions on Image Processing, vol. 21, No. 2, Feb. 2012, pp. 718-732.
Takaki, Yasuhiro, "High-Density Directional Display for Generating Natural Three-Dimensional Images", Proceedings of the IEEE, vol. 94, No. 3, Mar. 2006, pp. 654-663.
Tanimoto, Masayuki et al., "Reference Software of Depth Estimation and View Synthesis for FTV/3DV", International Organisation for Standardisation, ISO/IEC JTC1/SC29/WG11, MPEG2008/M15836, Busan, Korea, Oct. 2008, 5 pp. total.
Texas Instruments, "DLP Technology for Near Eye Display, Application Report", Literature No. DLPA051A, available online at http://www.ti.com/lit/wp/dlpa051a/dlpa051a.pdf, Sep. 2014, 18 pp. total.
Tian, Dong et al., "View Synthesis Techniques for 3D Video", Applications of Digital Image Processing XXXII, Proceedings of the SPIE, vol. 7443, 2009, pp. 74430T-1 to 74430T-11.
Urey, Hakan et al., "State of the Art in Stereoscopic and Autostereoscopic Displays", Proceedings of the IEEE, vol. 99, No. 4, Apr. 2011, pp. 540-555.
Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.

Walls, Frederick et al., "VESA Display Stream Compression", Downloaded at http://www.vesa.org/wp-content/uploads/2014/04/VESA_DSC-ETP200.pdf, Mar. 3, 2014, pp. 1-5.
Wang, Zhou et al., "Image Quality Assessment: From Error Visibility to Structural Similarity", IEEE Transactions on Image Processing, vol. 13, No. 4, Apr. 2004, pp. 600-612.
Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pp. total.
Wetzstein, Gordon et al., "Compressive Light Field Displays", IEEE Computer Graphics and Applications, vol. 32, Issue 5, Sep./Oct. 2012, pp. 6-11.
Wetzstein, Gordon et al., "Tensor Displays: Compressive Light Field Synthesis using Multilayer Displays with Directional Backlighting", 2012 Proceedings of ACM SIGGRAPH Transactions on Graphics (TOG), vol. 31, Issue 4, Article 80, Jul. 2012, 11 pp. total.
Wikipedia, "List of refractive indices", https://en.wikipedia.org/wiki/List_of_refractive_indices, Dec. 7, 2003, 5 pp. total.
X Company, "Glass", downloaded from http://www.google.com/glass/start/, which redirects to https://x.company/glass/, admitted prior art, 6 pp. total.
Yan, P. et al., "Integral image compression based on optical characteristic", IET Computer Vision, vol. 5, No. 3, 2011, pp. 164-168.
Yang, Lu et al., "Artifact reduction using reliability reasoning for image generation of FTV", Journal of Visual Communication and Image Representation, vol. 21, 2010, pp. 542-560.
Yang, Lu et al., "Error Suppression in View Synthesis Using Reliability Reasoning for FTV", 3DTV Conference: The True Vision—Capture, Transmission and Display of 3D Video (3DTV-CONO), Jun. 2010, 4 pp. total.
Yi, Faliu et al., "Fast 3D Computational Integral Imaging Using Graphics Processing Unit", Journal of Display Technology, vol. 8, No. 12, Dec. 2012, pp. 714-722.
Yi, Faliu et al., "Simultaneous reconstruction of multiple depth images without off-focus points in integral imaging using a graphics processing unit", Applied Optics, vol. 53, No. 13, May 1, 2014, pp. 2777-2786.
Yoo, Hoon, "Artifact analysis and image enhancement in three-dimensional computational integral imaging using smooth windowing technique", Optics Letters, vol. 36, No. 11, Jun. 1, 2011, pp. 2107-2109.
Zhang, Cha et al., "Compression of Lumigraph with Multiple Reference Frame (MRF) Prediction and Just-in-time Rendering", Proceeding of the 2000 Data Compression Conference, DCC 2000 Snowbird, UT, USA; Mar. 28-30, 2000, Los Alamitos, CA, USA; IEEE Comput. Soc., Mar. 28, 2000, pp. 253-262.
Zhao, Yin et al., "Boundary Artifact Reduction in View Synthesis of 3D Video: From Perspective of Texture-Depth Alignment", IEEE Transactions on Broadcasting, vol. 57, No. 2, Jun. 2011, pp. 510-522.
Zhao, Yin et al., "Suppressing Texture-Depth Misalignment for Boundary Noise Removal in View Synthesis", 28th Picture Coding Symposium, PSC2010, Nagoya, Japan, Dec. 8-10, 2010, pp. 30-33.
Nam, Dongkyung et al., "Flat Panel Light-Field 3-D Display: Concept, Design, Rendering, and Calibration", Proceedings of the IEEE, vol. 105, No. 5, May 2017, pp. 876-891.
"3-D Display Technologies—New Trends of Space Expression", CMC Publishing Co., Ltd., Toshio Honda, Supervising Editor, Dec. 4, 2013, pp. 80-84.
Shimizu, Shinya et al., "View Scalable Multiview Video Coding Using 3-D Warping With Depth Map", IEEE Transactions on Circuits and Systems for Video Technology, vol. 17, No. 11, Nov. 2007, pp. 1485-1495.
"Extended Search Report dated May 20, 2019; European Patent Application No. 16867077.6", May 20, 2019.
Li, Yun et al., "Coding of Plenoptic Images by Using a Sparse Set and Disparities", 2015 IEEE International Conference on Multimedia and Expo (ICME), Jun. 29, 2015, Jun. 29, 2015, pp. 1-6.

* cited by examiner

CONTENT ADAPTIVE LIGHT FIELD COMPRESSION

CROSS-REFERENCE TO RELATED APPLICATIONS

This application claims the benefit of U.S. Provisional Patent Application No. 62/255,744 filed Nov. 16, 2015.

BACKGROUND OF THE INVENTION

1. Field of the Invention

The invention herein relates to data compression of light field imaging information used by light field electronic displays for the display of ultra-high resolution 3D images utilizing techniques, such as holography, integral imaging, stereoscopy, multi-view imaging, video and the like. The invention has unique application to light field displays having common, industry-standard interfaces, such as HDMI, Displayport, MIPI, etc., for which data transfer bandwidth of the imaging information into the light field displays is known to be challenging.

2. Prior Art

In prior art light fields, neighboring hogels exhibit similar anglet data. The hogel appears to the viewer as a single point source, which could be implemented as a single lens of a micro-lens array above the light field display pixels (see U.S. Pat. No. 8,928,969). The reproduced 3D image, also known as a light field frame, consists of the complete set of hogels generated by the light field display. A light field video consists of a time-sequence of light field frames. Typically, an application processor pre-processes the input light field image data, such as real images acquired by cameras and/or rendered computer-generated images, and transfers the data to light field displays. In order to provide the necessary bandwidth between the application processor and light field displays having common interfaces currently available, such as HDMI, Displayport, MIPI, etc., the input signal is divided among several interfaces, which is cumbersome if not, in fact, infeasible due to data size limitations.

Data compression prior to transmission is employed to cope with the extreme volume of light field image data used by light field displays. Recently published methods for light field compression, such as the ones in Magnor, M. and Girod, B. "Data Compression for Light-Field Rendering," IEEE Trans. on Circuits and Systems for Video Technology, 10(3), 338-343 (2000) and Conti, C.; Lino, J.; Nunes, P.; Soares, L. D.; Lobato Correia, P., "Spatial prediction based on self-similarity compensation for 3D holoscopic image and video coding," in Image Processing (ICIP), 2011 18th IEEE International Conference on, vol., no., pp. 961-964, 11-14 Sep. 2011, follow the usual approach of prediction, transformation and residue quantization, similar to the methods adopted by prior art 3D video coding standards (Ohm, J.-R., "Overview of 3D video coding standardization," In International Conference on 3D Systems and Applications, Osaka, 2013). The drawback of these compression approaches is that they process the incoming data in frame buffers, which become extremely large when compressing high-resolution (and thus high volume) data, and necessarily introduce undesirable video latency for real-time display applications.

Another prior art solution for light field data compression is to "sub-sample" the views in the image generation procedure and reconstruct the suppressed views directly at the light field display. For example, in Yan, P.; Xianyuan, Y., "Integral image compression based on optical characteristic," *Computer Vision, IET*, vol. 5, no. 3, pp. 164, 168, May 2011 and Yan Piao; Xiaoyuan Yan, "Sub-sampling elemental images for integral imaging compression," *Audio Language and Image Processing (ICALIP)*, 2010 International Conference on, vol., no., pp. 1164, 1168, 23-25 Nov. 2010, the light field is sub-sampled based on the optical characteristics of the display system. A formal approach to light field sampling is described in Jin-Xiang Chai, Xin Tong, Shing-Chow Chan, and Heung-Yeung Shum. 2000. Plenoptic sampling. In *Proceedings of the 27th annual conference on Computer graphics and interactive techniques* (SIGGRAPH '00) and Gilliam, C.; Dragotti, P. L.; Brookes, M., "Adaptive plenoptic sampling," *Image Processing (ICIP)*, 2011 18th IEEE International Conference on, vol., no., pp. 2581, 2584, 11-14 Sep. 2011. Although these prior art methods provide a significant reduction in bit rates, the compression rate is undesirably highly content-dependent. Moreover, these methods usually rely on complicated view synthesis algorithms (for example, see the works in Graziosi et al, "Methods For Full Parallax Compressed Light Field 3D Imaging Systems", United States Provisional Patent Application No. 20150201176 A1, published Jul. 16, 2015, "View Synthesis Reference Software (VSRS) 3.5," wg11.sc29.org, March 2010, C. Fehn, "3D-TV Using Depth-Image-Based Rendering (DIBR)," in Proceedings of Picture Coding Symposium, San Francisco, Calif., USA, December 2004, Mori Y, Fukushima N, Yendo T, Fujii T, Tanimoto M (2009) View generation with 3D warping using depth information for FTV. Sig Processing: Image Commun 24(1-2):65-72 and Tian D, Lai P, Lopez P, Gomila C (2009) View synthesis techniques for 3D video. In: Proceedings applications of digital image processing XXXII, Vol. 7443, pp 74430T-1-11) requiring very large frame buffers, floating-point logic units, and several memory transfers. Thus, sub-sampling solutions require considerable display device computational resources Bhaskaran, V. "65.1: invited Paper: Image/Video Compression—A Display Centric Viewpoint," *SID Symposium Digest of Technical Papers*, vol. 39, no. 1, 2008.

Some compression methods have been developed specifically for stereoscopic video displays. For example, frame-compatible encoding methods for left and right views are described in Vetro, A.; Wiegand, T.; Sullivan, G. J., "Overview of the Stereo and Multiview Video Coding Extensions of the H.264/MPEG-4 AVC Standard," in *Proceedings of the IEEE*, vol. 99, no. 4, pp. 626-642, April 2011. These methods encode 3D stereoscopic video by down-sampling the video via bundling two contiguous frames into one new frame, either temporally or spatially (horizontally or vertically). Examples of frame-packing include side-by-side, where two frames are horizontally down-sampled and arranged next to each other, and top-bottom frame packing, where the two frames are vertically down-sampled and arranged on top of each other. By bundling two frames into one, the rate is reduced by half. Another advantage of this approach is that the decoding method is a very simple view reconstruction that can be implemented directly at the stereoscopic display. However, these encoding methods always perform the same data sub-sampling regardless of the image content, which results in less than optimal image quality.

In Graziosi, D. B., Alpaslan, Z. Y. And El-Ghoroury, H. S., "Compression for full-parallax light field displays", Proceedings of SPIE-IS&T Electronic Imaging, 9011, (2014), Graziosi, D. B., Alpaslan, Z. Y. And El-Ghoroury, H. S., "Depth assisted compression of full parallax light fields", Proceedings of SPIE-IS&T Electronic Imaging, 9011, (2015) and Graziosi et al, "Methods For Full Parallax Compressed Light Field 3D Imaging Systems", United States Patent Application Publication No. 2015/0201176 A1, a more sophisticated method for light field compression is described. The prior art compression method therein analyzes the composition of the entire light field scene and selects a subset of hogels from among all the hogels associated with the light field for transmission to the light field display, wherein the suppressed hogels are generated from the received hogels. To achieve even higher compression ratios, the prior art compression methods adopt transform and entropy encoding. The Graziosi, D. B., Alpaslan, Z. Y. And El-Ghoroury, H. S., "Compression for full-parallax light field displays", Proceedings of SPIE-IS&T Electronic Imaging, 9011, (2014), Graziosi, D. B., Alpaslan, Z. Y. And El-Ghoroury, H. S., "Depth assisted compression of full parallax light fields", Proceedings of SPIE-IS&T Electronic Imaging, 9011, (2015) and Graziosi et al, "Methods For Full Parallax Compressed Light Field 3D Imaging Systems", United States Patent Application Publication No. 2015/0201176 A1 would benefit from an enhanced compression method that reduces the required decoding processing by doing a piece-wise analysis of the scene and omitting the transform and entropy encoding step. The reduction in decoding time and processing would beneficially lead to a smaller memory footprint and reduced latency, which is ideal for display interfaces using memory and processors commonly available.

As is known in the prior art, there are extremely high-resolution displays that require the use of multiple interfaces to receive source image data. In Alpaslan, Z. Y., El-Ghoroury, H. S., "Small form factor full parallax tiled light field display," in SPIE Conference on Stereoscopic Displays and Applications XXVI, 2015, a high-resolution light field display formed by tiling multiple small pixel-pitch devices (U.S. Pat. Nos. 7,623,560, 7,767,479, 7,829,902, 8,049,231, 8,243,770 and 8,567,960) is described. The light field display described therein incorporates multiple input interfaces to compensate for the bandwidth limitation of the individual display interfaces commonly used. The lack of high-bandwidth interfaces motivated subsequent development of compression algorithms. In the prior art of FIG. 1, application processor 101 processes and formats light field (hogel) data 111 for transfer to light field display 102. Image generation 103 digitizes the light field (hogel) data 111 acquired by one or more light field cameras and also renders any computer generated scenes required. Encoder 104 compresses the input image to a size that fits the bandwidth limitations of data transmission (TX) TX interface 105 for wireline or wireless transmission. The link 106 between the Application Processor 101 and the Light Field display 102 shows the number B identifying the link bandwidth required. At the light field display 102, the compressed data received (RX) by the RX interface 107 is transferred to the decoder 108 for reconstruction of the compressed anglets. The reconstructed light field image is then modulated by the display photonics 109.

The Video Electronics Standards Association (VESA) Display Stream Compression (DSC) algorithm is a proposed standard for compression of raw video data to be sent to high-resolution displays. The VESA DSC encoder is visually faithful; i.e., the artifacts introduced by compression are hardly perceived by the viewer. The VESA DSC algorithm utilizes sophisticated prediction techniques mixed with very simple entropy encoding methods and was designed with display interfaces in mind; hence, it performs all of its processing on a line-by-line basis and has a very precise rate control procedure to maintain the bit rate below the limited bandwidth of common display interfaces. However, the VESA DSC algorithm does not utilize the block coding structure approach used in common video compression methods and does not take advantage of the highly correlated image structure present in light fields, both of which can provide significant compression gains.

In applications where the intensities of light rays do not change perceptibly as the rays propagate, the light field can be parameterized using two parallel planes, or equivalently four variables (Levoy, M. and Hanrahan, P., "Light Field Rendering," *Proceedings of the 23$^{rd}$ annual conference on Computer Graphics and Iteractive Techniques, SIGGRAPH 96*). This parameterization was used in Levoy, M. and Hanrahan, P., "Light Field Rendering," *Proceedings of the 23$^{rd}$ annual conference on Computer Graphics and Iteractive Techniques, SIGGRAPH 96* to capture a light field and reconstruct novel view points of the light field by utilizing light ray interpolation. In order to obtain reconstructed views with high quality and realistic results, oversampling of the variables was required. This imposes a high demand on the capturing and transmission procedures, which then must generate and transmit a huge amount of data. The use of compression methods such as the VESA DSC can reduce the data requirements for transmission interfaces. Nevertheless, this procedure is still based on prediction and entropy coding, which increases the computational resources at the display driver. Furthermore, the procedure does not take advantage of the structure of light field images with the high degree of correlation between hogels.

The aforementioned prior art fails to accommodate high quality, low computational load high-resolution light field transmission methods as is required for practical implementation of a full parallax light field display. What is needed is a compression method that takes advantage of the correlation between hogels and that avoids the computational loading and latency associated with prior art compression methods.

BRIEF DESCRIPTION OF THE DRAWINGS

In the following description, like drawing reference numerals are used for the like elements, even in different drawings. The matters defined in the description, such as detailed construction and elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which.

DETAILED DESCRIPTION OF THE PREFERRED EMBODIMENTS

Figure 1:
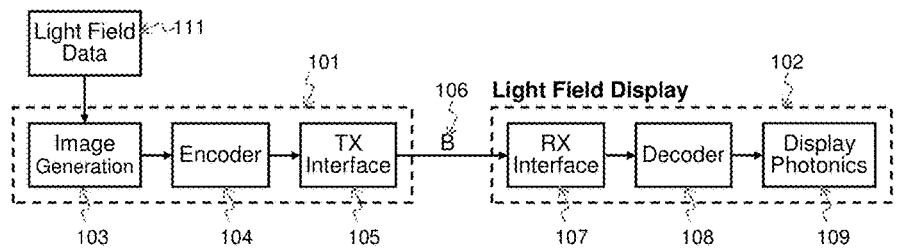
FIG. 1 shows a prior art generic block diagram of light field compression for high resolution displays.

A "light field" is a vector function that completely describes the amount of light flowing in every direction through every point in space, including its direction, amplitude, frequency, and phase. In particular, the collection of light rays emitted from a scene composed of 3D objects is considered to be a light field. By emitting light with modulated color, intensity and direction, light field displays are able to reproduce a light field of scenes to display 3D objects without the need for glasses and with reduced vergence accommodation conflict (VAC).

To reproduce 3D images, light field displays incorporate a sufficient number of pixels, with each pixel generating a collimated light bundle modulating color and intensity of a view of the light field in a unique direction, designated and referred to as an "anglet". A holographic element, or "hogel", consists of the group of neighboring anglets pointing to all viewing directions reproducible by the display. In a hogel, anglets are created by modulating a group of pixels assigned to a hogel. The three types of modulation are: modulation color by mixing color primaries, modulation of intensity by adjusting the drive time or drive current of the pixels, and modulation of direction based on pixel location. Typically displays have three color primaries (red, green and blue), however, some displays may have more than three or less than three primaries. For a light field that includes color, each hogel can be considered to be multiple hogels, each for a specific color or color primary in the light field.

This invention herein discloses content-aware light field coding methods that achieve straightforward compression gains coupled with constant bit-rate coding. Specifically, the invention utilizes the content of the light field scenes for making dynamic decisions on the piece-wise decimation of the light field information in such a way as to achieve a fixed compression ratio. This fixed-rate compression approach herein provides simple encoding and decoding with minimal latency to allow the use of interfaces and processors as are commonly available. The compression method can also be incorporated into both the acquisition procedure, so that the suppressed data is not stored in memory, and the rendering procedure, so that suppressed data is not rendered. The compression method can be incorporated in both acquisition and rendering, or it can be in either of them. When incorporated in both the amount of compression may increase. Hence, both memory and rendering processing requirements are greatly reduced.

The disclosed light field compression method expands the capabilities of prior art light field devices and methods by making it feasible to transmit high-resolution, full parallax light fields for various light field imaging systems utilizing common interfaces. Additional objectives and advantages of this invention will become apparent from the following detailed description of a preferred embodiment thereof that proceeds with reference to the accompanying drawings.

The disclosed invention can readily be applied to light fields that have been acquired in different ways. For example, a light field can be acquired by utilizing an array of 2D cameras, with the cameras arranged on a regular grid. This form of camera array arrangement can be emulated by placing a microlens array in front of the image sensor, such as is described in U.S. Pat. No. 9,179,126 or implemented in commercial light field cameras. The cameras in such an array can be arranged in a plane that is perpendicular to the viewing direction with only horizontal and vertical displacement or placed in a non-regular arrangement, such as the L16 camera proposed by a company named Light. Non-regular camera arrangements can be used, but this results in a more complicated view projection. The advantage of a regular grid is that anglets from the hogels are related to each other by horizontal or vertical shifts only, which decreases the related processor load for hogel reconstruction.

To display a light field, the associated display apparatus frequently utilizes a microlens on top of the pixel grid for directional modulation of the light rays. A microlens array preferentially divides the pixel grid into regular squared areas, corresponding to identical hogels arranged regularly. If the input signal is not acquired with a camera array having the same optical properties as the display's microlens array, then a light field data reformatting is required.

The invention herein combines content adaptive encoding and scene analysis-based light field sub-sampling methods. Regardless of the scene content, the resulting down-sampled light field achieves a fixed compression ratio. In the described embodiment of the invention, a fixed 2:1 compression is achieved by rearranging the light field, such that adjacent pairs of hogels are compressed to the size of a single hogel. Similarly, by combining 2×2 hogels, 4×1 hogels or 1×4 hogels into the size of a single hogel, a fixed 4:1 compression is achieved by natural extensions of the methods presented here. Higher combinations of hogels are contemplated as falling within the scope of the invention, resulting in commensurately higher compression ratios. For clarity, FIG. 2 through FIG. 10 are illustrations of this invention for the exemplar 2:1 compression only and do not describe the higher compressions supported and enabled by this invention except as set forth at the end of this description, which higher compression ratios are expressly contemplated as within the scope of the invention.

The distinction between simple frame-compatible encoding and the methods of this invention is that the former uses pixel sub-sampling only, while the methods of this invention include dynamic decisions on a frame-by-frame basis according to the content of the light field among three different sub-sampling methods. Hence, this invention provides compression that dynamically adapts to the content, while maintaining a fixed compression ratio and a simple decoding method.

Figure 2:
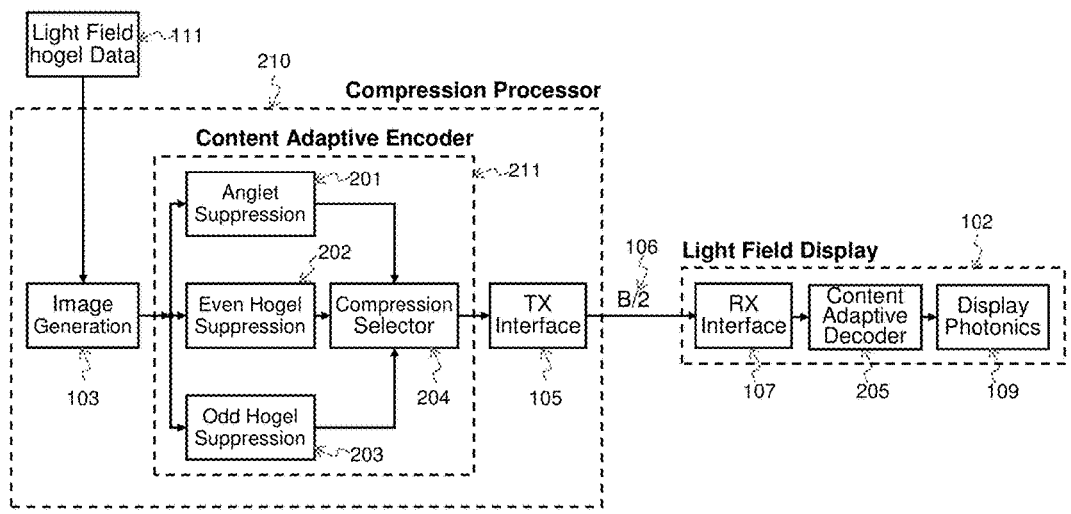
FIG. 2 illustrates a block diagram of an embodiment of this invention and presents details on the disclosed compression method for high resolution light field displays interconnection.

FIG. 2 shows the structure of the encoder 104 of this invention for the exemplar 2:1 compression. Encoder 104 employs three distinct compression methods: designated anglet suppression 201, even hogel suppression 202 and odd hogel suppression 203. Compression selector 204 uses the minimum of their associated fidelity metrics to select which data to transfer to the TX interface 105. At the light field display 102, the data received by the RX interface 107 is processed by the content adaptive decoder 205 for reconstruction of the suppressed anglets. The reconstructed anglets along with the transmitted anglets generate the high resolution light field image for the display photonics 109. For the example of 2:1 compression, the compression method reduces the required link 106 bandwidth B by a factor of one half, i.e.; to B/2. When higher compression ratios are implemented, the bandwidth B is reduced commensurately; e.g., N:1 compression reduces the bandwidth to B/N.

Figure 3:
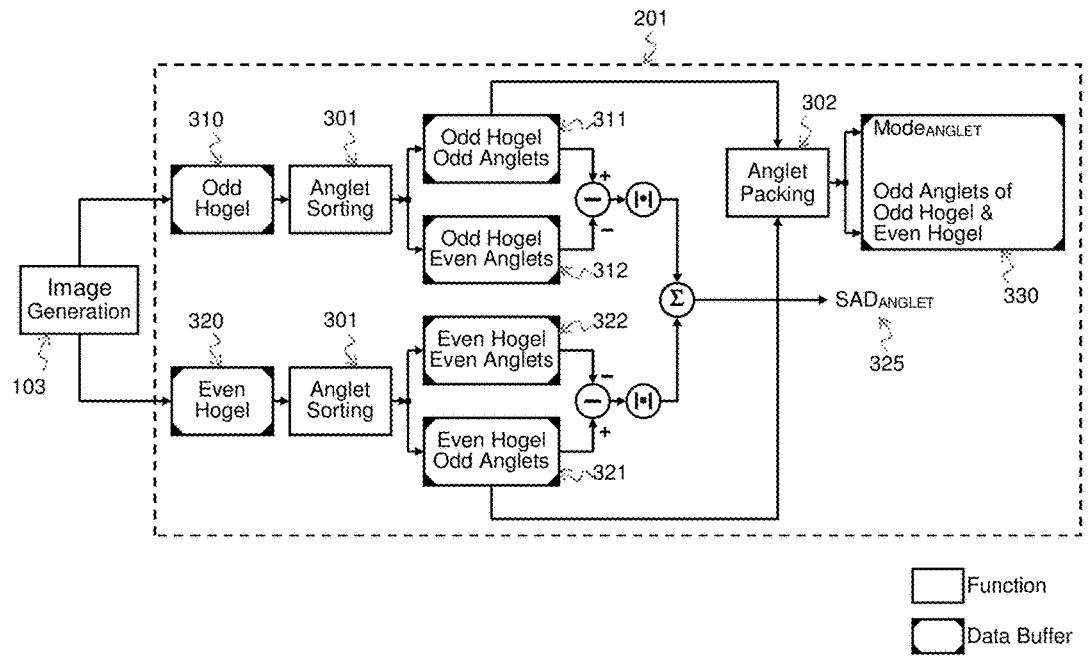
FIG. 3 illustrates an embodiment of the anglet suppression method of the invention.

FIG. 3 is a block diagram illustrating the anglet suppression 201. Image generation 103 converts the input into pairs of adjacent hogels and saves these hogels into two data buffers. Every pair of adjacent hogels in the light field frame can be characterized as one odd hogel 310 and one even hogel 320, analogous to a checkerboard layout pattern, assuming the camera divides the pixel grid into regular squared areas, though this is not a limitation of the invention. The anglet compression method preferably processes the light field frame hogels as pairs of adjacent hogels subject to the constraint that each hogel is a member of only one pair, i.e.; is included only once. Similarly, every pair of adjacent anglets in every light field frame hogel may be characterized as one being an odd anglet and the other being an even anglet, in a manner analogous to the checkerboard layout pattern of the hogel arrangement. The anglets of each hogel pair are sorted 301 into four data buffers; namely, all odd anglets of odd hogels 311, all even anglets of odd hogels 312, all even anglets of even hogels 322, and all odd anglets of even hogels 321. The odd anglets of both the odd hogels 311 and the even hogels 321 are selected to be transmitted to the light field display 102 and are packed together 302 into data buffer 330. (The choice of odd anglets is arbitrary; even anglets may be selected by a user instead.) The fidelity metric $SAD_{ANGLET}$ 325 is the sum of (1) the absolute differences of the intensities of the odd hogel odd anglets 311 and the corresponding odd hogel even anglets 312 and (2) the absolute differences of the intensities of the even hogel even anglets 322 and the corresponding even hogel odd anglets 321. It is noted that anglets layout patterns other than a checkerboard pattern may be applied within the context of this invention. For instance, all the even anglets and all the odd anglets may be lined up in alternating columns or alternating rows, which may result in some reduction in coder/decoder processing loads. Similarly a hexagonal pattern rather than a checkerboard pattern may be used.

Figure 4:
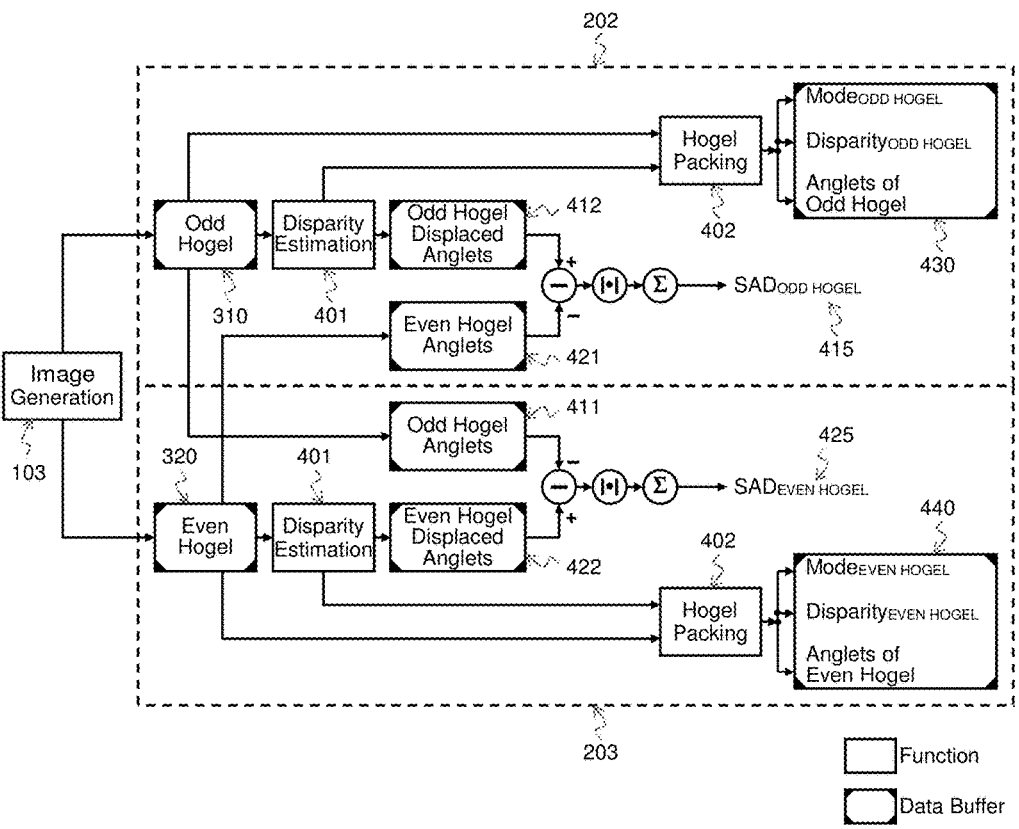
FIG. 4 illustrates an embodiment of the odd and even hogel suppression of the invention.

FIG. 4 is a block diagram illustrating the even hogel and the odd hogel suppressions, 202 and 203; respectively. Similar to anglet suppression 201, image generation 103 converts the inputs into pairs of adjacent hogels and saves the hogels into two data buffers, odd hogel 310 and even hogel 320. For each hogel of a pair of adjacent hogels, its respective anglet data may be displaced to new positions, such that the hogel formed from the original hogel with displaced anglets is similar enough to the opposite hogel of the pair to function as a substitute for it. Hence, the anglets of each hogel of a pair of adjacent hogels are placed into separate data buffers for the original hogel anglets, 411 and 421 and the original hogel displaced anglets, 412 and 422. The fidelity metrics $SAD_{ODD\ HOGEL}$ 415 and $SAD_{EVEN\ HOGEL}$ 425 for these two compression methods is the sum of the absolute differences of the intensities of the anglets of the original hogel and the corresponding displaced anglets of the opposite hogel of the pair. The displacement amount, designated the disparity, may be estimated 401 by varying the displacement amount until the fidelity metric for this compression method reaches a minimum value. This could be done by applying a disparity estimation algorithms (such as stereo matching), or by minimizing the SAD fidelity metrics defined above with a sliding window type operation. The original hogel with full resolution along with its estimated disparity value are packed together 402 in data buffers 430 and 440. In one embodiment of this invention, the estimated disparity value is a unique value valid for the entire hogel. This is advantageous for the decoding procedure, since it simplifies the hogel reconstruction procedure. Nevertheless, this invention may also be applied to segments of the hogel image, and the disparity value may be determined to a block of anglets or even to a single anglet. More disparity values received with the selected hogels can be used to refine the received disparity value, and perform local disparity estimation. Therefore more disparity values received with the selected hogels may yield better reconstruction quality but require higher link bandwidth 106 for transfer to the light field display.

Figure 5:
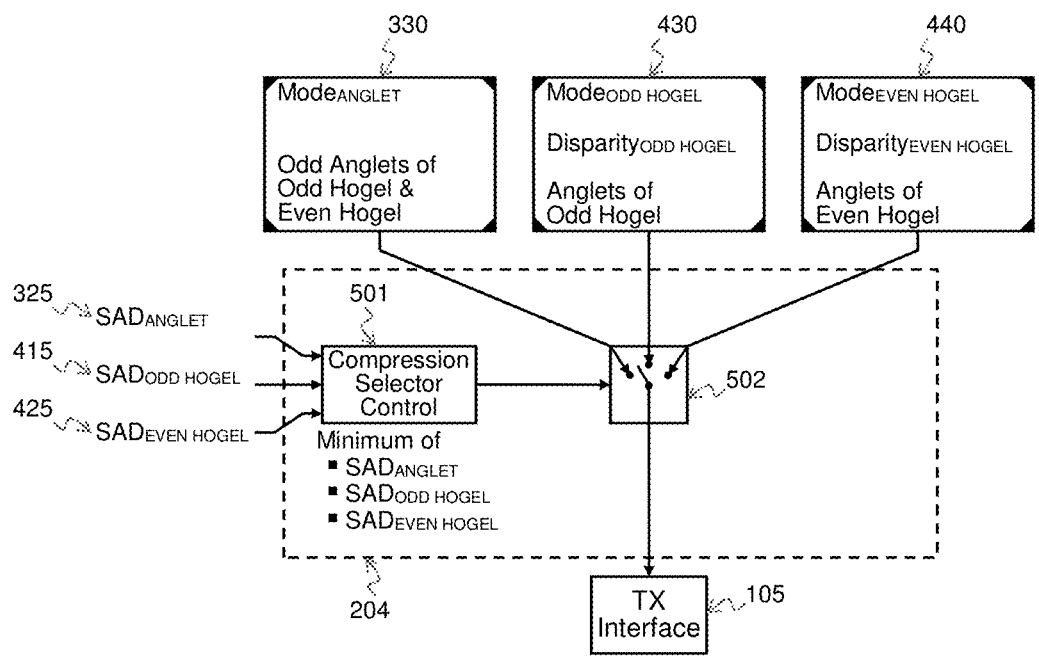
FIG. 5 illustrates the compression selection method of the invention.

As shown in FIG. 5, the compression selector control 501 decides among compressed data buffers 330, 430, and 440 by selecting the minimum fidelity metric of 325, 415, and 425 and adjusts the compression selector switch 502 accordingly to transfer the selected compressed data buffer to the TX interface 105. If $SAD_{ANGLET}$ is the minimum fidelity metric, then the compression mode is set to $Mode_{ANGLET}$ and odd anglets of the odd & even hogel and the compression mode are transmitted. If $SAD_{ODD\ HOGEL}$ is the minimum fidelity metric, then the compression mode is set to $Mode_{ODD\ HOGEL}$ and disparity of the odd hogel, anglets of the odd hogel and the compression mode are transmitted. If $SAD_{EVEN\ HOGEL}$ is the minimum fidelity metric, then the compression mode is set to $Mode_{EVEN\ HOGEL}$ and disparity of the even hogel, anglets of the even hogel and the compression mode are transmitted.

Figure 6:
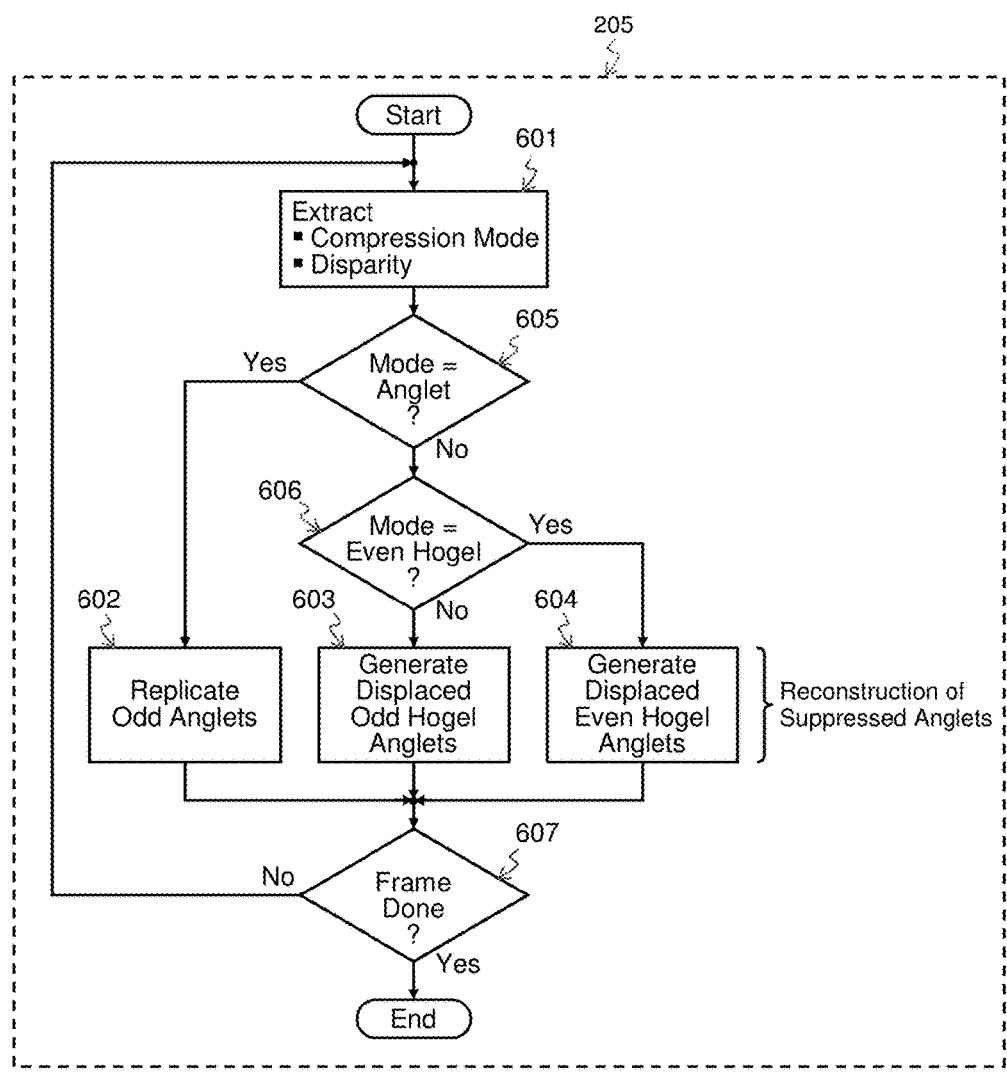
FIG. 6 illustrates an embodiment of the content adaptive decompression of the invention.

FIG. 6 shows details of the content adaptive decoder 205. The received data is first unpacked 601, where the compression mode and disparity value are extracted from the compressed data. The compression mode is checked in 605 and 606 to indicate whether to replicate odd anglets 602 or to generate displaced odd hogel anglets 603 or to generate displaced even hogel anglets 604 in the reconstruction of suppressed anglets. This procedure is repeated until the input frame is fully reconstructed 607. Due to the decoding simplicity, the method disclosed in this invention is particularly suitable for low latency, computationally-constrained light field displays. More complicated anglet interpolation schemes, such as bicubic interpolation, and more complicated hogel reconstruction schemes, such as the ones that utilize per anglet disparity values, are also within the scope of this invention. More complicated methods of interpolation would be more useful when the amount of compression increases to more than 2:1, as these methods would enable more faithful reconstruction of the decoded light field data.

Figure 7:
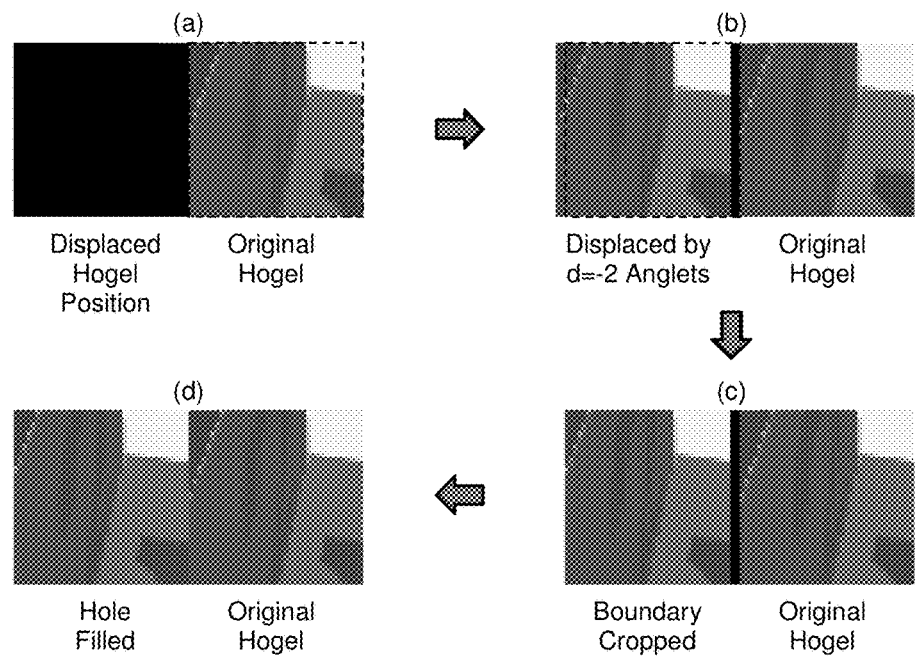
FIG. 7 illustrates an example of hogel reconstruction.

FIG. 7 illustrates images generated by hogel reconstruction. FIG. 7(a) shows an image generated by the original hogel's anglets. FIG. 7(b) shows the image generated by the original hogel's anglets and the image generated by the original hogel's anglets displaced by the disparity amount to a new position. After displacement, some of the anglets fall outside the boundary of the displaced hogel position, while other anglet positions are not filled. FIG. 7(c) shows the image generated after a boundary cropping operation to eliminate those anglets that fall outside of the hogel boundary. FIG. 7(d) shows the image generated after the anglet positions that were not filled, designated holes, have been filled. The filling method is to copy the intensity value of the anglet closest to the hole position, which is just one of several different methods available to fill holes that can be used within the context of the methods of this invention.

Figure 8:
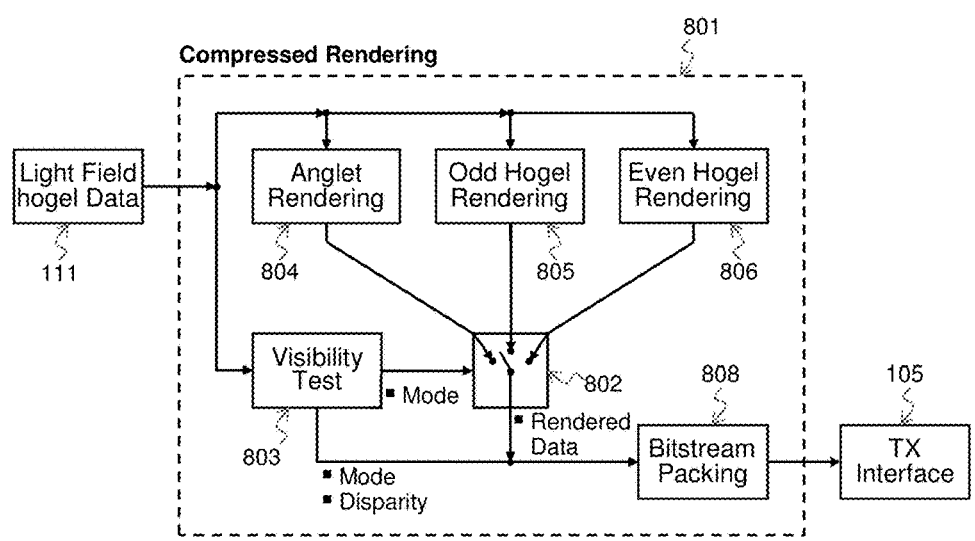
FIG. 8 illustrates the block diagram of the compressed rendering method of the invention.

In United States Patent Application Publication No. 2015/0201176 A1, the concept of compressed rendering was introduced, wherein compression is applied in the rendering process to suppress data that can be eliminated at the source and simply not generated or rendered. In an embodiment of this invention, the renderer suppresses the light field data, such that only half of the total light field data is rendered with a commensurate reduction in processing load. When the light field data is not fully rendered we can achieve additional data compression, computational and power savings by first selecting which hogels should be rendered and applying compression to these hogels after they are rendered or as they are rendered (the rendering and compression operations can be combined). FIG. 8 shows the details of the compressed rendering 801 procedure. Based on the objects of a scene indicated by the light field data 111, the visibility test 803 chooses between three different rendering modes, designated anglet rendering 804, odd hogel rendering 805, or even hogel rendering 806. The selector switch 802 uses the rendering mode to enable the selected light field rendering from among anglet rendering 804, odd hogel rendering 805, or even hogel rendering 806. In the case of anglet rendering 804, both hogels are rendered but only the odd anglets are kept, whereas in the case of odd hogel rendering 805 or even hogel rendering 806, only one hogel of the pair is rendered. Furthermore, the visibility test calculates the disparity value from the position of objects present. The rendering modes, disparity values and the rendered light field data anglets are then packed together 808 and transmitted to the TX interface 105 to be decoded with the content adaptive decoder 205.

Figure 9:
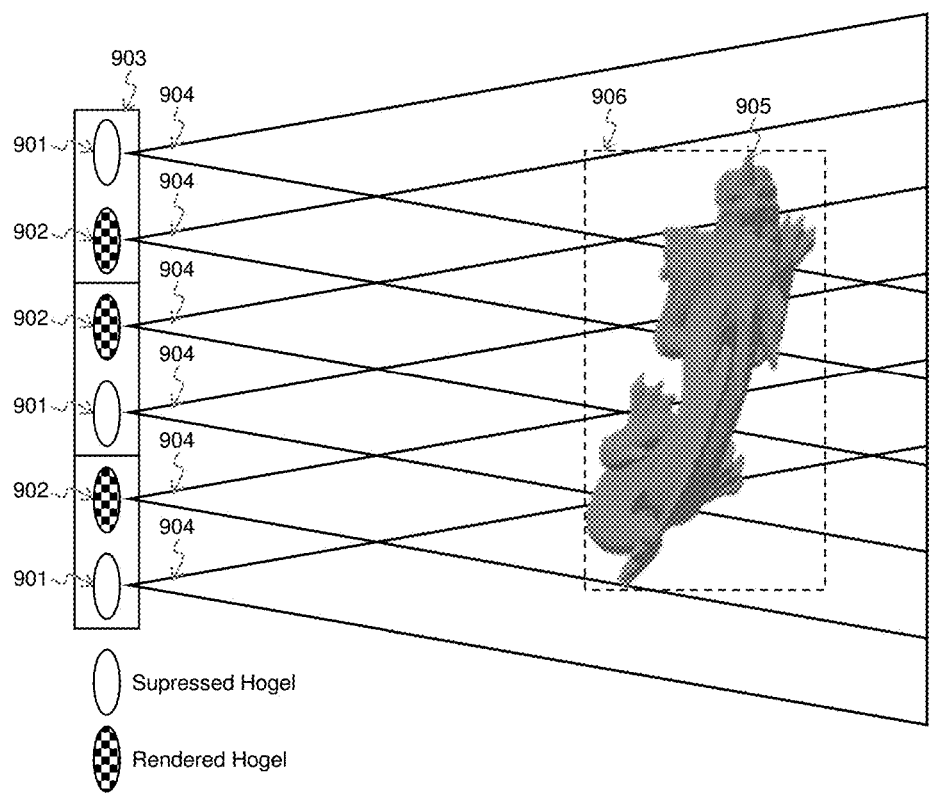
FIG. 9 illustrates a result for a visibility test method of the invention.

FIG. 9 illustrates an example of the rendering mode selection process in the visibility test. In FIG. 9, each hogel is represented as a single lens of a micro-lens array, and the anglets emitted from the hogel collectively determine the hogel's field of view (FOV) 904. Depending on the hogel's FOV and the position of objects in the scene, the visibility test selects a reduced number of hogels that are to be rendered 902 and suppresses the remaining hogels. In one embodiment of this invention, for each object, the visibility test establishes a bounding box 906 aligned with the display surface. The hogel that is selected for rendering is the one of the pair with the most anglets hitting the aligned surface of the bounding box. The disparity value is calculated from the depth of the bounding box or from the most representative depth value of the rendered hogel.

Figure 10:
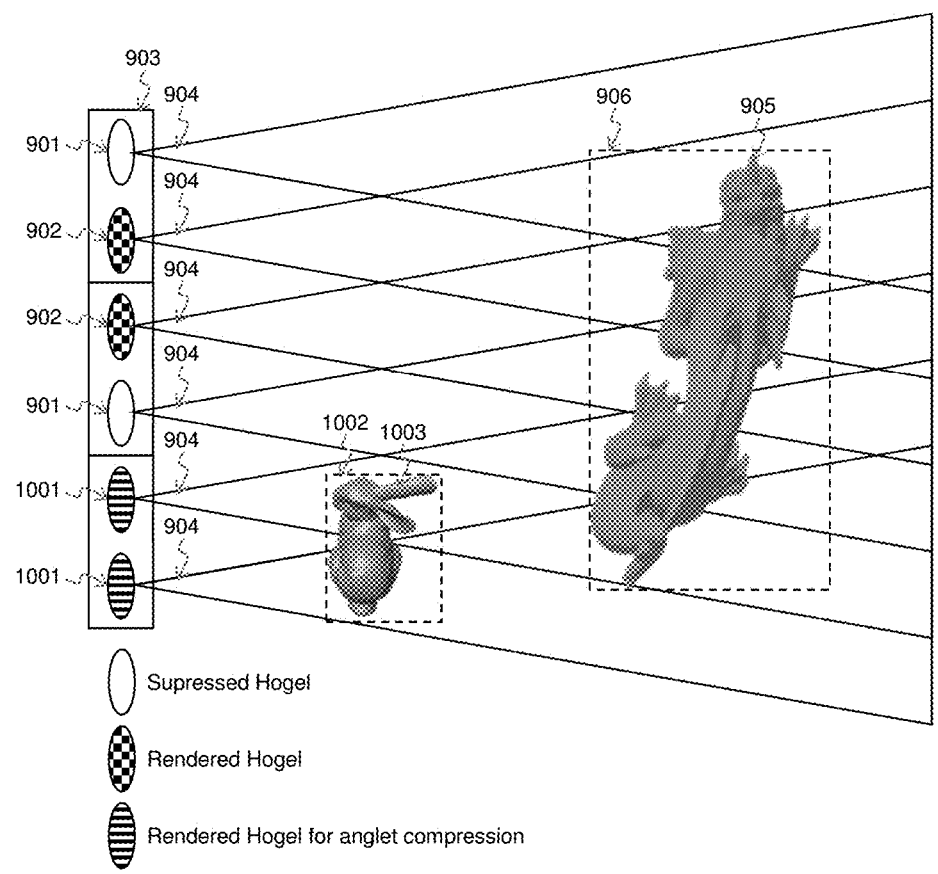
FIG. 10 illustrates a further example of a selection of hogels obtained from the visibility test method of the invention.

FIG. 10 also illustrates an example of the rendering mode selection process in the visibility test. As illustrated in FIG. 10, if an object is too close to the light field display, such as the bunny object 1003 with bounding box 1002, then the intensities of the anglets hitting the aligned surface of the bounding box of one of the hogels of the pair of hogels can be very different from the other hogel of the pair. In such case, anglet compression would be more efficient than hogel compression. Hence, both hogels are selected to be rendered and anglet compression 1001 is utilized instead.

The foregoing disclosure described 2:1 compression methods in detail, which methods may be practiced in hardware, firmware or software. Also as previously mentioned, the methods of the present invention may be expanded to higher compression ratios. By way of example, to extend the methods to 4:1 compression, one can simply apply the method described to two pairs of adjacent hogels, typically but not necessarily in a 2×2 hogel pattern, and then select the hogel of the 2×2 hogel pattern with the best fidelity metric. Thus in FIG. 6 for this embodiment, the selection would be the selection of 1 in 5 rather than the 1 in 3 shown. These 5 modes would be Anglet mode (where 3 out of 4 anglets are decimated), Hogel-1 mode, Hogel-2 mode, Hogel-3 mode or Hogel-4 mode. Similarly, while the embodiment disclosed employs three distinct compression methods in the compression processor 210 of FIG. 2, fewer or greater numbers of compression methods may be used, though the resulting fidelity metric for compression methods used should be of a comparable scale so the comparison of fidelity metrics is meaningful in the selection of which data to transfer to the TX interface. Also other or more sophisticated methods may be used for 4:1 compression and higher, as desired.

Those skilled in the art will readily appreciate that various modifications and changes can be applied to the embodiments of the invention without departing from its scope defined in and by the appended claims. It should be appreciated that the foregoing examples of the invention are illustrative only, and that the invention can be embodied in other specific forms without departing from the spirit or essential characteristics thereof.

What is claimed is:

1. A method for compressing high-definition light field hogel data that includes multicolor high-definition light field hogel data for transmission of the compressed high definition light field hogel data in a limited-bandwidth by wire or wireless transmission systems, comprising:
 establishing a plurality of compression methods, each compression method having a light field hogel data dependent metric indicative of a light field reconstruction quality the respective compression method will provide;
 determining for each compression method, a value of the light field hogel data dependent metric for the high-definition light field hogel data to be compressed;
 selecting the compression method yielding the light field hogel data dependent metric indicative of a most favorable light field reconstruction quality;
 compressing the high-definition light field hogel data according to the compression method selected; and
 packing a compression mode and disparity values with the compressed high-definition light field hogel data, the compression mode being indicative of the compression method selected, wherein the high-definition light field hogel data is high-definition light field hogel data for each color or primary color in the multicolor high-definition light field hogel data, and wherein the compressing the high-definition light field hogel data is carried out on a color hogel by color hogel basis.

2. The method of claim 1 wherein the compression methods compress a pair of adjacent hogels into a single hogel.

3. The method of claim 1 wherein the compression methods compress more than a pair of adjacent hogels into a single hogel.

4. The method of claim 3 wherein the high-definition light field hogel data comprises hogel anglet data, and wherein bicubic anglet interpolation is used in compressing the high-definition light field hogel data according to the compression method selected.

5. The method of claim 1 wherein one of the compression modes $Mode_{ANGLET}$ is a method of compressing corresponding anglets of adjacent color hogels of the same color.

6. The method of claim 5 wherein a pair of adjacent anglets of one color hogel and a corresponding pair of anglets of an adjacent color hogel of the same color are compressed by packing one color anglet of a first of the adjacent pair of color hogels with the corresponding color anglet of a second of the adjacent pair of color hogels as the compressed high-definition light field hogel data.

7. The method of claim 6 wherein the high-definition light field hogel data dependent metric for the compression mode $Mode_{ANGLET}$ is calculated by:
  for each color hogel
  a) separating odd and even hogels, the odd and even hogels being adjacent hogels;
  b) for odd and even anglets in each of the odd and even hogels, the odd and even anglets being adjacent anglets in the respective hogel and each anglet having an intensity;
    1) determining the absolute difference in intensity of the even anglet of the odd hogel and the intensity of the odd anglet of the odd hogel;
    2) determining the absolute difference in intensity of the even anglet of the even hogel and the intensity of the odd anglet of the even hogel; and
    3) summing the absolute differences of 1) and 2).

8. The method of claim 7:
  wherein a second and third of the compression modes are methods of compressing adjacent color hogels of the same color;
  wherein the high-definition light field hogel data dependent metrics for the methods of compressing adjacent color hogels of the same color is calculated by:
  for each color hogel
  a) separating odd and even hogels, the odd and even hogels being adjacent hogels;
  b) for odd and even anglets in each of the odd and even hogels, the odd and even anglets being corresponding adjacent anglets in the respective hogel and each anglet having an intensity;
    1) determining the absolute difference in intensity of the even hogel anglets and the intensity of the odd hogel anglets as displaced as the high-definition light field hogel data dependent metric $SAD_{ODD\ HOGEL}$ for the compression mode $Mode_{ODD\ HOGEL}$ for compressing adjacent color hogels; and
    2) determining the absolute difference in intensity of the odd hogel anglets and the intensity of the even hogel anglets as displaced as the compressed high-definition light field hogel data dependent metric $SAD_{EVEN\ HOGEL}$ for the compression mode $Mode_{EVEN\ HOGEL}$ for compressing adjacent color hogels;
    3) the displacement or displacements of the even hogel anglets as displaced and the odd hogel anglets as displaced each being estimated by varying the displacement amount or amounts until the respective high-definition light field hogel data dependent metric for the respective compression mode reaches a minimum value;
  wherein for the compression mode having the high-definition light field hogel data dependent metric referred to as $SAD_{ODD\ HOGEL}$, the packing is a packing of the mode $Mode_{ODD}$ HOGEL, the disparity or disparities equal to the displacement or displacements of the anglets of the odd hogel, and the intensity of the anglets of the odd hogel, and for the high-definition light field hogel data dependent metric referred to as $SAD_{EVEN\ HOGEL}$, the packing is a packing of the mode $Mode_{EVEN\ HOGEL}$, the disparity or disparities equal to the displacement or displacements of the anglets of the even hogel, and intensity of the anglets of the even hogel;
  the method further comprising decoding the compressed high-definition light field hogel data by:
    i) unpacking the packed compression mode, disparity value or values and compressed high-definition light field hogel data;
    ii) when the unpacked compression mode is $Mode_{ANGLET}$, replicate odd anglets;
    iii) when the unpacked compression mode is $Mode_{EVEN\ HOGEL}$, generate displaced even hogel anglets;
    iv) when the unpacked compression mode is $Mode_{ODD\ HOGEL}$, generate displaced odd hogel anglets; and
  repeat ii) through iv) until a respective frame is done.

9. The method of claim 1 wherein two of the compression modes are methods of compressing adjacent color hogels of the same color.

10. The method of claim 9 wherein the high-definition light field hogel data dependent metrics for the methods of compressing adjacent color hogels of the same color is calculated by:
  for each color hogel
  a) separating odd and even hogels, the odd and even hogels being adjacent hogels;
  b) for odd and even anglets in each of the odd and even hogels, the odd and even anglets being adjacent anglets in the respective hogel and each anglet having an intensity;
    1) determining the absolute difference in intensity of the even hogel anglets and the intensity of the odd hogel anglets as displaced as the high-definition light field hogel data dependent metric $SAD_{ODD\ HOGEL}$ for the compression mode $Mode_{ODD\ HOGEL}$ for compressing adjacent color hogels; and
    2) determining the absolute difference in intensity of the odd hogel anglets and the intensity of the even hogel anglets as displaced as the compressed high-definition light field hogel data dependent metric $SAD_{EVEN\ HOGEL}$ for the compression mode $Mode_{EVEN\ HOGEL}$ for compressing adjacent color hogels;
    3) the displacement or displacements of the even hogel anglets as displaced and the odd hogel anglets as displaced each being estimated by varying the displacement amount or amounts until the respective high-definition light field hogel data dependent metric for the respective compression mode reaches a minimum value.

11. The method of claim 10 wherein for the compression mode having the high-definition light field hogel data dependent metric referred to as $SAD_{ODD\ HOGEL}$, the packing is a packing of the mode $Mode_{ODD\ HOGEL}$, the disparity or disparities equal to the displacement or displacements of the anglet of the odd hogel, and the intensity of the anglet of the odd hogel, and for the high-definition light field hogel data dependent metric referred to as $SAD_{EVEN\ HOGEL}$, the packing is a packing of the mode $Mode_{EVEN\ HOGEL}$, the disparity or disparities equal to the displacement or displacements of the anglets of the even hogel, and intensity of the anglets of the even hogel.

12. The method of claim 1 wherein the method is applied to segments of a hogel.

13. The method of claim 1 wherein a fixed disparity value is applied to a block of anglets.

14. The method of claim 1 further comprising decoding and reconstruction of a frame of high-definition light field hogel data compressed by:
  a) unpacking the packed compression mode, disparity values and compressed high-definition light field hogel data to extract the packed compression mode, the disparity values and the compressed high-definition light field hogel data;

b) reconstructing the high-definition light field hogel data from the compressed high-definition light field hogel data using the compression mode to select a reconstruction method from a plurality of reconstruction methods, each reconstruction method corresponding to a respective one of the plurality of compression methods.

15. The method of claim 14 wherein the high-definition light field hogel data is anglet data, and wherein the reconstructing of the high-definition light field hogel data from the compressed high-definition light field hogel data uses per anglet disparity values.

16. The method of claim 1 further comprising:
selecting hogels to be compressed and disparity values to be used for reconstruction using a visibility test;
compressing the selected hogels using the compression method of claim 1;
packing the compression mode and disparity values with the compressed high-definition light field hogel data for further transmission.

17. The method of claim 16, further comprising extracting a bounding box of objects in the scene.

18. The method of claim 17, wherein a hogel that is selected is a hogel of a pair of hogels with the most anglets hitting an aligned surface of the bounding box.

19. The method of claim 17, further comprising calculating the disparity values from the depth of the bounding box or from the most representative depth value of the compressed hogel.

* * * * *